United States Patent
Homyak et al.

(10) Patent No.: US 11,825,861 B2
(45) Date of Patent: Nov. 28, 2023

(54) PROCESS FOR ENHANCING SOLUBILITY OF PLANT PROTEIN COMPOSITIONS

(71) Applicant: Ripple Foods, PBC, Berkeley, CA (US)

(72) Inventors: Celia Homyak, Oakland, CA (US); Stephanie Kraemer, Santa Cruz, CA (US); Daniel Mulugeta, Oakland, CA (US)

(73) Assignee: Ripple Foods, PBC, Berkeley, CA (US)

( * ) Notice: Subject to any disclaimer, the term of this patent is extended or adjusted under 35 U.S.C. 154(b) by 217 days.

(21) Appl. No.: 17/179,873

(22) Filed: Feb. 19, 2021

(65) Prior Publication Data

US 2021/0274807 A1    Sep. 9, 2021

Related U.S. Application Data

(60) Provisional application No. 62/979,553, filed on Feb. 21, 2020.

(51) Int. Cl.
*A23J 3/14* (2006.01)
*A23L 33/185* (2016.01)
*A23J 3/34* (2006.01)

(52) U.S. Cl.
CPC ............... *A23J 3/14* (2013.01); *A23J 3/346* (2013.01); *A23L 33/185* (2016.08)

(58) Field of Classification Search
CPC ............ A23J 3/14; A23J 3/346; A23L 33/185
USPC ........................................................ 426/656
See application file for complete search history.

(56) References Cited

U.S. PATENT DOCUMENTS

| | | | |
|---|---|---|---|
| 5,989,600 A | 11/1999 | Nielsen | |
| 6,605,311 B2 | 8/2003 | Villagran | |
| 2004/0224074 A1* | 11/2004 | Cho | A23L 33/16 426/629 |
| 2009/0117231 A1* | 5/2009 | Murray | A23L 2/66 530/421 |
| 2011/0052779 A1 | 3/2011 | Hirata | |
| 2021/0259294 A1* | 8/2021 | Ito | A23K 20/147 |

FOREIGN PATENT DOCUMENTS

| | | |
|---|---|---|
| AU | 692859 | 6/1998 |
| RU | 2422035 | 6/2011 |
| WO | 1995028850 | 11/1995 |
| WO | 2007033481 | 3/2007 |
| WO | 2017120597 | 7/2017 |
| WO | 2020007940 | 1/2020 |

OTHER PUBLICATIONS

International Search Report issued in PCT/US2021/018740 dated May 25, 2021 (3 pages).
Written Opinion issued in PCT/US2021/018740 dated May 25, 2021 (5 pages).

* cited by examiner

*Primary Examiner* — Hamid R Badr
(74) *Attorney, Agent, or Firm* — FisherBroyles, LLP; Adam K. Whiting

(57) ABSTRACT

The present disclosure discloses methods for preparing plant-based protein compositions, such as a pea protein isolate, comprising alkaline phosphate salts, wherein the compositions exhibit greatly improved solubility. The high solubility of these plant-based protein isolate compositions greatly facilitates the manufacture of food and beverage products containing plant-based protein.

22 Claims, 3 Drawing Sheets

PROCESS FOR ENHANCING SOLUBILITY OF PLANT PROTEIN COMPOSITIONS

CROSS REFERENCE TO RELATED APPLICATION

This application claims priority benefit of U.S. Provisional Patent Application Ser. No. 62/979,553, filed on Feb. 21, 2020, the entirety of which is incorporated herein by reference.

FIELD

The present disclosure relates to preparation plant protein compositions, such as pea protein isolate, that exhibit improved solubility and improved utility in the manufacture of plant-based protein food and beverage products.

BACKGROUND

There is a growing consumer demand for plant-protein-based foods and beverages. Most plant-protein-based food and beverage formulations contain plant proteins as a substantial component which poses challenges for manufacturing. Typically, the plant protein isolate compositions for use in manufacturing these food and beverage products exhibit low solubility (e.g., ~5%) relative to animal-based proteins. This low solubility is believed to contribute substantially to various problems associated with these products, such as the presence of gritty or chalky solids. Additionally, low solubility of the plant protein component increases the difficulty and costs of the manufacturing process.

U.S. Pat. No. 6,605,311B2 relates to insoluble, denatured, heat-stable particles of protein, including plant protein, for use in food and beverage products. AU692859B2 relates to a method for improving the solubility of vegetable proteins by treating the vegetable protein with phytase enzymes and proteolytic enzymes. RU2422035C2 relates to a method for production of a canola protein isolate by extraction of canola seed meal that produces an aqueous solution of canola protein with a pH 5 to 6.8.

Therefore, there still exists an unmet need for highly soluble plant protein compositions that can be used in the preparation of plant protein-based food and beverage formulations, such as non-dairy analogs.

The present disclosure is directed to solving these and other problems disclosed herein. The present disclosure is also directed to overcome and/or ameliorate at least one of the disadvantages of the prior art as will become apparent from the discussion herein.

SUMMARY

This summary is not meant to cover each and every embodiment; combination or variations are contemplated with the present disclosure. Additional embodiments are disclosed in the detailed description, drawings, and claims.

The present disclosure provides methods for preparing plant protein compositions (e.g., pea-protein isolates) with alkaline phosphate salts that result in compositions having the surprising and advantageous effect of greatly increased aqueous solubility across a wide pH range. These methods of preparation and resultant plant protein isolate compositions are thus useful in the preparation a wide range of food and beverage that contain plant proteins, such as non-dairy analog and beverage formulations containing pea-protein.

In at least one embodiment, the present disclosure provides a method for preparing a plant protein composition comprising: (a) adding an alkaline phosphate salt composition to an aqueous solution of plant protein isolate having a protein content of 5-20%, wherein the added alkaline phosphate salt composition to protein content on a dry weight basis is 3-98%, 3-45%, 4-20%, or 10-95%. In at least one embodiment, the method further comprises the steps of (b) pasteurizing the solution of step (a) to a temperature of 73-86° C. for at least 30-70 seconds; and (c) drying the solution of step (b) to form a plant protein composition having a protein content of at least 70%.

In at least one embodiment, the method can be carried out wherein the alkaline phosphate salt composition comprises trisodium phosphate and/or tripotassium phosphate; optionally, wherein the alkaline phosphate salt composition comprises trisodium phosphate and/or tripotassium phosphate in an amount of 5-100 wt %. In at least one embodiment, an amount of 70-100 wt %, 80-100 wt %, 90-100 wt %, 5-75 wt %, 5-50 wt %, 5-25 wt %, or 5-20 wt %. In at least one embodiment, the added alkaline phosphate salt to protein content on a dry weight basis is 3-45%, or 4-20%.

In at least one embodiment, the method can be carried out wherein the alkaline phosphate salt composition comprises hexametaphosphate sodium salt and/or hexametaphosphate potassium salt; optionally, in an amount of 5-100 wt %. In at least one embodiment, the added alkaline phosphate salt to protein content on a dry weight basis 10-95%.

In at least one embodiment, the method can be carried out wherein the alkaline phosphate salt composition comprises: (a) trisodium phosphate and/or tripotassium phosphate; (b) disodium phosphate and/or dipotassium phosphate; and (c) hexametaphosphate sodium salts and/or hexametaphosphate potassium salts; optionally, 5-20 wt % trisodium phosphate and/or tripotassium phosphate; 20-40 wt % disodium phosphate and/or dipotassium phosphate; and 50-80 wt % hexametaphosphate sodium salts and/or hexametaphosphate potassium salts.

In at least one embodiment, the method can be carried out wherein the plant protein isolate is a base-extracted plant protein isolate; optionally, wherein the based-extracted plant protein isolate is prepared by extraction of a plant protein concentrate solution with 10-100 mM NaOH. In at least one embodiment, the method can be carried out wherein the plant protein isolate is a neutral-extracted plant protein isolate; optionally, wherein the neutral-extracted plant protein isolate is prepared by extraction of a plant protein concentrate solution with hot water.

In at least one embodiment, the method can be carried out wherein the aqueous solution of plant protein isolate is pH 5-10; optionally, the pH is 6.5-9.5.

In at least one embodiment, the method can be carried out wherein the alkaline phosphate salt composition comprises polyphosphate sodium salts and/or polyphosphate potassium salts; optionally, polyphosphate sodium salts and/or polyphosphate potassium salts in an amount of 5-100 wt %.

In at least one embodiment, the method can be carried out wherein the alkaline phosphate salt composition comprises: (a) trisodium phosphate and/or tripotassium phosphate; (b) disodium phosphate and/or dipotassium phosphate; and (c) polyphosphate sodium salts and/or polyphosphate potassium salts; optionally, 5-20 wt % trisodium phosphate and/or tripotassium phosphate; 20-40 wt % disodium phosphate and/or dipotassium phosphate; and 50-80 wt % polyphosphate sodium salts and/or polyphosphate potassium salts.

In at least one embodiment, the method can be carried out wherein step (c) comprises spray-drying the solution to form a powder plant protein composition.

In at least one embodiment, the method can carried out wherein the powder plant protein composition comprises a protein content of 70-95 wt %.

In at least one embodiment, the method can carried out wherein the plant protein composition exhibits an aqueous solubility at pH 7 of at least 20%, at least 25%, at least 30%, at least 40%, at least 50%, or at least 60%.

In at least one embodiment, the method can be carried out wherein the aqueous solubility at pH 7 of the plant protein composition relative to the aqueous solubility at pH 7 of a plant protein composition prepared without adding an alkaline phosphate salt composition to an aqueous solution of plant protein isolate having a protein content of 5-20% is increased by at least 2-fold, at least 3-fold, at least 4-fold, at least 5-fold, or more.

In at least one embodiment, the method can be carried out wherein the plant protein isolate is from a legume. In at least one embodiment, the method can carried out wherein the plant protein isolate is from a pea plant. In at least one embodiment, the method can carried out wherein the plant protein isolate is pea protein isolate.

In at least one embodiment, the present disclosure provides a plant protein composition, wherein the composition is prepared according to any of the methods for preparing a plant protein composition described above or elsewhere herein.

In at least one embodiment, the present disclosure provides a plant protein composition comprising a dried plant protein isolate comprising at least 70 wt % protein content and an added alkaline phosphate salt to protein content on a dry weight basis is 3-98%, 3-45%, 4-20%, or 10-95%.

In at least one embodiment of the plant protein composition, the alkaline phosphate salt comprises a salt of an orthophosphate ion, metaphosphate, trimetaphosphate, and/or hexametaphosphate with an alkali metal ion and/or an alkaline earth metal ion.

In at least one embodiment of the plant protein composition, the alkaline phosphate salt comprises trisodium phosphate and/or tripotassium phosphate; optionally, wherein the alkaline phosphate salt comprises trisodium phosphate and/or tripotassium phosphate in an amount of 5-100 wt %, 70-100 wt %, 80-100 wt %, or 90-100 wt % of the alkaline phosphate salts. In at least one embodiment the added alkaline phosphate salt to protein content on a dry weight basis is 3-45%, or 4-20%.

In at least one embodiment of the plant protein composition, the alkaline phosphate salt comprises hexametaphosphate sodium salt and/or hexametaphosphate potassium salt; optionally, in an amount of 5-100 wt %, 50-80%, 70-100 wt %, 80-100 wt %, or 90-100 wt %. In at least one embodiment, the added alkaline phosphate salt to protein content on a dry weight basis is 10-95%.

In at least one embodiment of the plant protein composition, the composition has an aqueous solubility at pH 7 is at least 20%, at least 25%, at least 30%, at least 40%, at least 50%, or at least 60%.

In at least one embodiment of the plant protein composition, the composition has an aqueous solubility at pH 7 relative to the aqueous solubility at pH 7 of a plant protein composition without the alkaline phosphate salt is increased by at least 2-fold, at least 3-fold, at least 4-fold, at least 5-fold, or more.

In at least one embodiment of the plant protein composition, the plant protein isolate is a base-extracted plant protein isolate; optionally, wherein the based-extracted plant protein isolate is prepared by extraction of a plant protein concentrate or plant protein flour solution with 10-100 mM NaOH. In at least one embodiment of the plant protein composition, the plant protein isolate is a neutral-extracted plant protein isolate.

In at least one embodiment of the plant protein composition, the plant protein isolate is from a legume. In at least one embodiment of the plant protein composition, the plant protein isolate is from a pea plant. In at least one embodiment of the plant protein composition, the plant protein isolate is a pea protein isolate.

In at least one embodiment, the present disclosure provides uses of the highly soluble plant protein compositions prepared using the methods of the present disclosure in food and beverage products. Accordingly, in at least one embodiment, the present disclosure provides a food product, a beverage product, and/or a non-dairy analog, wherein at least a portion of the protein used in the non-dairy analog is a plant protein composition, wherein the composition is prepared according to any of the methods for preparing a plant protein composition described above or elsewhere herein.

In at least one embodiment, the use of the plant protein composition prepared using alkaline phosphate salt treatment as disclosed herein in a non-dairy analog results in increased solubility, increased dispersibility, and/or increased stability of the non-dairy analog when used as a substitute in a dairy product (e.g., yogurt, sour cream, creamers, and cheeses). In at least one embodiment, the non-dairy analog comprising at least a portion of the plant protein composition of the present disclosure exhibits reduced feathering when added to beverages (for example acidic beverages, such as coffee or tea).

BRIEF DESCRIPTION OF THE DRAWINGS

A better understanding of the novel features and advantages of the present disclosure will be obtained by reference to the following detailed description that sets forth illustrative embodiments, in which the principles of the disclosure are utilized, and the accompanying drawings (also "Figure" and "FIG." herein), of which.

DETAILED DESCRIPTION

Figure 1:
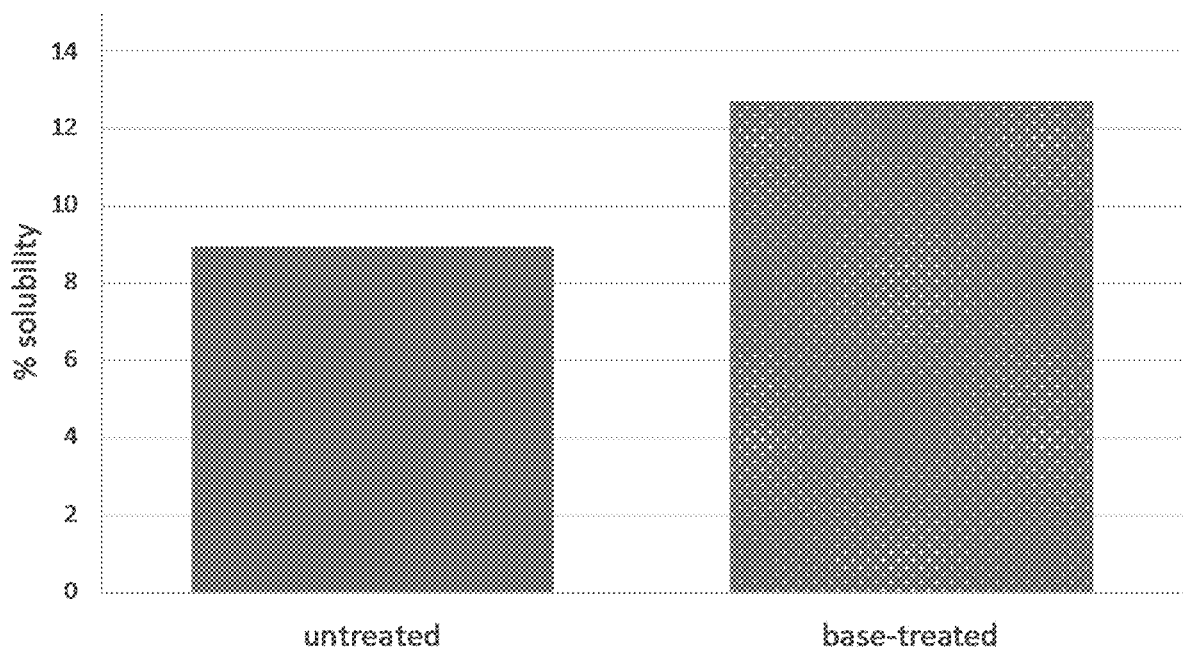
FIG. 1 depicts a plot showing the percentage solubility in aqueous solution at pH 7 of a "base-treated" spray-dried pea-protein isolate relative to an untreated spray-dried pea-protein isolate.

For the descriptions herein and the appended claims, the singular forms "a", and "an" include plural referents unless the context clearly indicates otherwise. Thus, for example, reference to "a protein" includes more than one protein. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. The use of "comprise," "comprises," "comprising" "include," "includes," and "including" are interchangeable and not intended to be limiting. It is to be further understood that where descriptions of various embodiments use the term "comprising," those skilled in the art would understand that in some specific instances, an embodiment can be alternatively described using language "consisting essentially of" or "consisting of."

The term "about" as used herein refers to greater or lesser than the value or range of values stated by 1/10 of the stated values, but is not intended to limit the value or range of values to only this broader definition. For instance, a value of "about 30%" means a value of between 27% and 33%. Each value or range of values preceded by the term "about" is also intended to encompass the embodiment of the stated absolute value or range of values. Where a range of values is provided, unless the context clearly dictates otherwise, it is understood that each intervening integer of the value, and each tenth of each intervening integer of the value, unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding (i) either or (ii) both of those included limits are also included in the invention. For example, "1 to 50," includes "2 to 25," "5 to 20," "25 to 50," "1 to 10," etc.

Generally, the nomenclature used herein, and the techniques and procedures described herein include those that are well understood and commonly employed by those of ordinary skill in the art. Unless defined otherwise, all technical and scientific terms used herein have the same meaning as is commonly understood by one of ordinary skill in the art to which this disclosure pertains. It is to be understood that the terminology used herein is for the purpose of describing particular embodiments only and is not intended to be limiting. For purposes of interpreting this disclosure, the following description of terms will apply and, where appropriate, a term used in the singular form will also include the plural form and vice versa.

Definitions

The term "plant protein" as used herein refers to a protein material obtained from a non-animal natural source or modified natural source, including but not limited to naturally occurring plants, algae, fungi, or microbes.

The term "plant protein concentrate" as used herein refers to a plant protein composition after removal of at least a portion of one or more of the following: carbohydrate, ash, and other minor constituents. A plant protein concentrate composition typically comprises at least 40 wt % to 70 wt % plant protein.

The term "plant protein flour" as used herein refers to a plant protein composition of ground or milled plant material (e.g., seeds), which typically comprise at least 1 wt % to 40 wt % plant protein.

The term "plant protein isolate" as used herein refers to a plant protein composition after removal of at least a portion of one or more of the following: insoluble polysaccharide, soluble carbohydrate, ash, and other minor constituents. A plant protein isolate composition typically comprises at least 70 wt % plant protein.

The terms "refined protein component" or "refined protein" as used herein refers to a protein preparation derived from a natural source and/or modified natural source that contains protein. The term encompasses protein isolate, protein concentrate, flour, meal and/or combinations thereof.

The term "base-extracted" as used herein refers to a plant protein isolate or concentrate that has been extracted into an aqueous solution phase at basic pH, separated (e.g., by decanting) from materials partitioned in the precipitated solid phase, and then optionally, acid-precipitated from the basic solution phase to provide a refined plant protein isolate solid.

The terms "stable," "solubilized" and "soluble" as used herein when referring to a plant protein mixed in an aqueous composition means that the mixture has a uniform, or substantially uniform appearance and may include an insubstantial amount of visible precipitation, or no visible precipitation.

The term "alkaline phosphate salt" as used herein refers to a salt of an orthophosphate ($PO_4^{3-}$) ion or polyphosphate ion, (e.g., tripolyphosphate, tetraphosphate, metaphosphate, trimetaphosphate, or hexametaphosphate) with an alkali metal ion (e.g., $Na^+$, $K^+$, $Rb^+$, $Cs^+$) or an alkali metal ion in combination with an alkaline earth metal ion (e.g., $Mg^{2+}$, $Ca^{2+}$, $Sr^{2+}$, $Ba^{2+}$). Exemplary alkaline phosphate salts useful in the methods of the present disclosure include trisodium phosphate ($Na_3PO_4$) ("TSP"), tripotassium phosphate ($K_3PO_4$), sodium tripolyphosphate ($Na_5P_3O_{10}$), sodium hexametaphosphate ($NaPO_3)_6$ ("SHP"), potassium hexametaphosphate ($KPO_3)_6$, and compositions comprising mixtures orthophosphate salts and polyphosphate salts, such as the commercially available composition, TexturMelt LM89 ("TXM") (Innophos LTD, USA).

The term "dry weight basis" means the mass of a material (e.g., TSP or protein) in a composition as compared to the total mass of solids in the composition determined using the mass of the dry material added to or measured in the composition. For example, the amount of the alkaline phosphate salt, TSP in a protein composition on a dry weight basis is determined using the total amount of dry TSP added to the protein composition relative to the analyzed total solids of the composition. Similarly, the amount of protein on dry weight basis in the composition is determined by using the measured total protein in the composition relative to the analyzed total solids in the composition. As described in the Examples and elsewhere herein, the ratio of the alkaline phosphate salt content on a dry weight basis to protein content on a dry weight basis can be used to characterize the plant protein compositions of the present disclosure that exhibit the advantageous property of enhanced solubility.

The term "non-dairy analog" as used herein refer to food products that can be used as a substitute for a dairy product but that is made from a non-dairy natural source and/or a modified natural source. Non-dairy analogs are produced to have one or more of the following qualities that are similar or substantially similar to the qualities of comparable dairy products (such as dairy milk or dairy cream): color, taste, nutritional content, stability, dispersibility, and/or solubility. Non-limiting examples of applications of non-dairy analogs is in milk, yogurts, puddings, ice creams, coffee creamers, heavy creams, whipping creams, sour creams, soft cheeses, hard cheeses or other suitable products in which a non-dairy analog may be used. One non-limiting application of non-dairy analogs exemplified in the present disclosure is as a substitute for milk or cream that may be used with tea, coffee, hot chocolate, or other beverages. As described elsewhere herein, in some embodiments the highly soluble plant protein compositions of the present disclosure can be used as the refined protein component in the preparation of a non-dairy analog.

The term "feathering" as used herein means the presence of particles due at least in part to flocculation or protein aggregation (instability) occurring when the non-dairy analog is dispersed in a hot beverage.

Preparation of Highly Soluble Plant Protein Compositions

As described elsewhere herein, standard purification protocols (e.g., base extraction and acid precipitation) used with plant protein isolates, such as the pea protein isolate, tend to result in refined plant protein isolates that have relatively low aqueous solubility in the range of 5%-8% under acidic to basic conditions (e.g., pH 5-9). The low solubility of these preparations results in problems when attempting to use them as an ingredient in plant protein-based food and beverage products, such as non-dairy product analogs. Amongst the significant problems caused by the low solubility of plant protein isolates are sedimentation and perceived grittiness of the food and beverage products during sensory analysis. The present disclosure provides an improved method of preparation of plant protein compositions that includes adding an alkaline phosphate salt composition during preparation. The resulting plant protein composition produce by this method exhibit high aqueous solubility (e.g., exceeding 25% over the range of pH 5.5-9). This improved aqueous solubility greatly facilitates the use of these refined plant protein preparations in various plant-based food and beverage product formulations.

Accordingly, in at least one embodiment, the method for preparing a highly soluble plant protein composition comprises (a) adding an alkaline phosphate salt composition to an aqueous solution of plant protein isolate having a protein content of between about 5-25%, wherein the added alkaline phosphate salt composition to protein content on a dry weight basis is 3-98%, 3-45%, 4-20%, or 10-95%.

It is contemplated that the protein content of the solution used in the method may vary between about 5% and 25% depending on the particular plant protein or other factors such as the purity of the starting protein isolate or concentrate. Typically, in the case of a pea protein isolate, the protein content of the solution used in the method can be between about 5% and 20%, between about 7% and 13%, or between about 7% and 13%. In at least one embodiment, the protein content of the aqueous solution of plant protein is between about 7-13%, or between about 9-11%.

It is contemplated that the amount of added alkaline phosphate salt composition used in the method is typically about between about 1% and 43% of the protein content on a dry weight basis. Of course, one of ordinary skill will recognize that this amount can vary depending on the particular plant protein used and/or the particular alkaline phosphate salt composition. Some plant proteins may require adding less or more alkaline phosphate salt to provide suitable aqueous solubility for a particular use. Accordingly, in some embodiments the method can be carried out wherein the added alkaline phosphate salt composition to protein content on a dry weight basis is about 3-98%, about 4-30%, or about 8-28%, about 3-45%, about 4-20%, or about 10-95%.

As described elsewhere herein, the method of preparation can be carried out any salt of an orthophosphate and/or polyphosphate ion, (e.g., tripolyphosphate, metaphosphate, trimetaphosphate, tetrametaphosphate, or tetraphosphate) with an alkali metal ion (e.g., $Na^+$, $K^+$, $Rb^+$, $Cs^+$) or an alkali metal ion in combination with an alkaline earth metal ion (e.g., $Mg^{2+}$, $Ca^{2+}$, $Sr^{2+}$, $Ba^{2+}$). A range of exemplary alkaline phosphate salt compositions are contemplated that can be used in the methods including: trisodium phosphate ($Na_3PO_4$), tripotassium phosphate ($K_3PO_4$), sodium tripolyphosphate ($Na_5P_3O_{10}$), and/or mixtures of orthophosphate salts and/or polyphosphate salts. Mixed alkaline phosphate salt compositions can include commercially manufactured mixtures such as TexturMelt LM89 (Innophos LTD, USA), or the like.

Accordingly, in at least one embodiment, the method can be carried out wherein the alkaline phosphate salt composition comprises trisodium phosphate and/or tripotassium phosphate; optionally, wherein the alkaline phosphate salt composition comprises trisodium phosphate and/or tripotassium phosphate in an amount of 5-100 wt %; optionally, an amount of 70-100 wt %, 80-100 wt %, 90-100 wt %, 5-75 wt %, 5-50 wt %, 5-25 wt %, or 5-20 wt %.

In at least one embodiment, the method can be carried out wherein the alkaline phosphate salt composition comprises polyphosphate sodium salts and/or polyphosphate potassium salts in an amount of 5-100 wt %; optionally, an amount of 70-100 wt %, 80-100 wt %, 90-100 wt %, 5-75 wt %, 5-50 wt %, 5-25 wt %, or 5-20 wt %.

In at least one embodiment, the method can be carried out wherein the alkaline phosphate salt composition comprises: (a) trisodium phosphate and/or tripotassium phosphate; and (b) polyphosphate sodium salts and/or polyphosphate potassium salts; optionally, trisodium phosphate and/or tripotassium phosphate in an amount of 5-95 wt % and polyphosphate sodium salts and/or polyphosphate potassium salts in an amount of 5-95 wt %.

It is also contemplated that the alkaline phosphate salt composition can include other phosphate salts such as disodium phosphate and/or dipotassium phosphate. Accordingly, in at least one embodiment, the method can be carried out wherein the alkaline phosphate salt composition comprises: (a) trisodium phosphate and/or tripotassium phosphate and (b) disodium phosphate and/or dipotassium phosphate; optionally, trisodium phosphate and/or tripotassium phosphate in an amount of 5-95 wt %, and disodium phosphate and/or dipotassium phosphate in an amount of 5-95 wt %.

In at least one embodiment, the method can be carried out wherein the alkaline phosphate salt composition comprises: (a) trisodium phosphate and/or tripotassium phosphate; (b) disodium phosphate and/or dipotassium phosphate; and polyphosphate sodium salts and/or polyphosphate potassium salts; optionally, 5-20 wt % trisodium phosphate and/or tripotassium phosphate; 20-40 wt % disodium phosphate and/or dipotassium phosphate; and 50-80 wt % polyphosphate sodium salts and/or polyphosphate potassium salts.

Typically, methods of preparation of plant protein isolate compositions for use in plant-based food and beverage products will also include a step of pasteurization. Pasteurization, however, can have detrimental effects on solubility of a plant protein composition. It is a surprising advantage of the method that the technical effect of high solubility associated with the alkaline phosphate treated plant protein composition is retained even after pasteurization of the solution. Accordingly, in at least one embodiment the method can further comprise: (b) pasteurizing the alkaline phosphate treated solution of step (a). It is contemplated that any standard pasteurization conditions can be used. For example, in at least one embodiment, the method further comprises: (b) pasteurizing the alkaline phosphate treated solution to a temperature of 73-86° C. for at least 30-70 seconds.

In at least one embodiment, the plant protein isolate composition resulting from the alkaline phosphate salt treatment (e.g., step (b)) is a wet protein slurry or a wet suspension.

Additionally, methods for preparing a refined plant protein composition for use in plant-based food and beverage products will also include a final drying step to produce a solid or powder composition. While drying can result in a plant protein powder composition that is difficult to solubilized in aqueous solution, the inclusion of a final drying step in the method of preparation of the present disclosure does negatively affect solubility even at high protein contents. Accordingly, in at least one embodiment, the method can further comprise: (c) drying the solution of step (b) to form a plant protein composition having a protein content of at least 70%, at least 80%, or at least 90%. In some embodiments, the drying can result in a plant protein composition having a protein content of between 75%-95%, or between 75%-85%. Additionally, in at least one embodiment, the method can be carried out wherein the drying step (c) comprises spray-drying the solution to form a powder plant protein composition. Typical spray-drying conditions, instrumentation, and parameters known in the art for use in plant proteins can be used. Spray-drying equipment that can be used includes the FT80 Tall Form Spray Dryer (Armfield Group, UK) used according to manufacturer's specifications. Exemplary spray-drying conditions are also provided in the Examples, e.g., an inlet temperature setting of 250° C. and inlet air pressure of 20 psi.

It is contemplated that the method for preparing a plant protein composition can include not only the alkaline phosphate treatment in addition to the steps of pasteurization and drying. Accordingly, in at least one embodiment, the method of preparation comprises: (a) adding an alkaline phosphate salt composition to an aqueous solution of plant protein isolate having a protein content of 5-20%, wherein the added alkaline phosphate salt composition to protein content on a dry weight basis is 3-98% 3-45%, 4-20%, or 10-95%; (b) pasteurizing the solution of step (a) to a temperature of 73-86° C. for at least 30-70 seconds; and (c) drying the solution of step (b) to form a plant protein composition having a protein content of at least 70%.

Additionally, the methods of preparation using an alkaline phosphate salt treatment can be carried out with a starting plant protein ingredient (e.g., concentrate, isolate, flour) that has been pre-treated and/or partially purified using any of the standard techniques for purifying a plant protein. Exemplary purification procedures useful in the methods of the present disclosure can comprise one or more of the following steps, in or out of order:
  (a) obtaining a protein preparation from a non-animal natural source;
  (b) washing the protein preparation at a wash pH;
  (c) extracting the protein preparation at an extraction pH to obtain an aqueous protein solution;
  (d) separating the aqueous protein solution from non-aqueous components;
  (e) adding salt;
  (f) precipitating the protein from the aqueous protein solution at a precipitation pH to obtain a protein precipitate;
  (g) separating the protein precipitate from non-precipitated components; and/or
  (h) washing the protein precipitate to obtain a refined protein component.

Suitable wash and extraction conditions (e.g., pH) can be determined by testing various conditions, and identifying the condition at which the most optimal yield and quality, as determined by, for example, one or more of the following: flavor, odor, color, nitrogen content, Ca content, heavy metal content, emulsification activity, MW distribution, and thermal properties of the protein component obtained) of the refined protein component is obtained. In some embodiments, the wash and extraction pH conditions useful in the methods of the present disclosure are alkaline pH. In some such embodiments, the alkaline pH is at least 7.1, at least 8, at least 9, at least 10, at least 11, at least 12, between 7.1 and 10, between 8 and 10, between 9 and 10, or between 8 and 9. In some such embodiments, the alkaline pH is 8.5. Alternatively, in some embodiments, the wash and extraction pH conditions can be acidic pH. For example, in some embodiments, the wash and/or extraction pH is less than 7, less than 6.95, less than 6.5, less than 5, less than 4, less than 3, between 2 and 6.95, between 3 and 6, or between 3 and 5.

The pH for extraction of a plant protein isolate can be adjusted using a pH adjusting agent, such as a food grade basic or acidic pH adjusting agent. Examples of suitable basic pH adjusting agents include, but are not limited to, potassium bicarbonate, sodium bicarbonate, sodium hydroxide, potassium hydroxide, calcium hydroxide, ethanolamine, calcium bicarbonate, calcium hydroxide, ferrous hydroxide, lime, calcium carbonate, trisodium phosphate, and combinations thereof. Examples of suitable acidic pH adjusting agents include, but are not limited to, phosphoric acid, acetic acid, hydrochloric acid, citric acid, succinic acid, and combinations thereof.

Generally, it is desired to select wash and/or extraction conditions that result in obtaining as much refined plant protein isolate as is practicable so as to provide an overall high product yield. The yield of protein in the aqueous protein solution may vary widely, wherein typical yields range from 1% to 90%. The protein solution typically has a protein concentration of between 1 g/L and 300 g/L. The molecular weight distribution of the proteins in the aqueous protein isolate solution may vary widely.

Separation of the aqueous plant protein isolate solution from various non-aqueous components may be accomplished by various methods, including but not limited to, centrifugation followed by decanting of the supernatant above the pellet, or centrifugation in a decanter centrifuge. Centrifugation can be followed by disc centrifugation and/or filtration (e.g., using activated carbon) to remove residual protein source material and/or other impurities. Such separation steps can be conducted at various temperatures within the range of 1° C. to 100° C. For example, the separation step may be conducted between 10° C. and 80° C., between 15° C. and 70° C., between 20° C. and 60° C., or between 25° C. and 45° C.

The separated aqueous plant protein isolate solution may be diluted or concentrated prior to further processing. Dilution is usually affected using water, although other diluents may be used. Concentration may be affected by membrane-based methods. In some embodiments, the diluted or concentrated aqueous plant protein isolate solution comprises between 1 g/L and 300 g/L, between 5 g/L and 250 g/L, between 10 g/L and 200 g/L, between 15 g/L and 150 g/L, between 20 g/L and 100 g/L, or between 30 g/L and 70 g/L by weight of protein. Optionally, the plant protein isolate solution may be concentrated and/or separated from small, soluble molecules. Suitable methods for concentrating include, but are not limited to, diafiltration or hydrocyclone. Suitable methods for separation from small, soluble molecules include, but are not limited to, diafiltration.

In some embodiments, pre-treatment or purification using salt precipitation may be accomplished using various suitable salts and precipitation pHs. Suitable salts, salt concentrations, polysaccharides, polysaccharide concentrations, and precipitation pHs may be determined by testing various conditions, and identifying the salt and pH and polysaccharide condition which are obtained the most colorless and/or flavorless protein precipitates at the most optimal yield and quality (judged by, for example, by one or more of the following: flavor, odor, color, nitrogen content, calcium content, heavy metal content, emulsification activity, MW distribution, and thermal properties of the protein component obtained). Examples of suitable salts useful for precipitation steps can include, but are not limited to, other alkaline earth metal or divalent salts (e.g., magnesium chloride, sodium chloride, calcium permanganate, and calcium nitrate). Typically, the precipitation pH is opposite the extraction pH (i.e., when the extraction pH is in the basic range, the precipitation pH is most suitable in the acidic range, and vice versa). In some embodiments, the precipitation pH is an acidic pH. In some such embodiments, the acidic pH is less than 7.1, less than 6, less than 5, less than 4, less than 3, less than 2, between 6.9 and 2, between 6 and 3, between 6 and 5, or between 5 and 4. In some such embodiments, the acidic pH is 4. The precipitation pH may be adjusted using a pH adjusting agent. In some embodiments, the pH adjusting agent is a food grade acidic pH adjusting agent. In other embodiments, the pH adjusting agent is a food grade basic pH adjusting agent.

Precipitates of plant protein isolates may optionally be re-suspended. In some embodiments, the suspending can carry out at the extraction pH, for example, in the presence of a chelator to remove calcium ions. If the suspended protein preparation is not transparent it may be clarified by various convenient procedures such as filtration or centrifugation.

Drying of plant protein isolates can be performed in many suitable ways, including, but not limited to, spray drying, dry mixing, drum drying, agglomerating, freeze drying, microwave drying, drying with ethanol, evaporation, refractory window dehydration or combinations thereof. Additionally, in some embodiments the plant protein isolate can be dried using spray drying, drum drying, dry mixing, agglomerating, freeze drying, microwave drying, drying with ethanol, evaporation, refractory window dehydration, and/or combinations thereof.

Other optional steps for pre-treatment and/or purification of the plant protein isolates used in the methods provided herein are heating steps aimed at removing heat-labile contaminants and/or microbial contaminations, and additional filtering (e.g., carbon filtering) steps aimed at removing additional odor, flavor, and/or color compounds. In some embodiments, such additional filtering is carried out immediately after extracting the protein preparation or after separating the aqueous protein solution from the non-aqueous components.

In at least one embodiment of the method of the present disclosure, the refined plant protein component may be pre-treated for various purposes, such as, for example, extracting the protein preparation in a solvent to remove lipids, and heat treating the protein preparation to remove volatiles. In at least one embodiment, the methods of the present disclosure can include an initial base-extraction of plant protein. For example, an initial pea flour sample can be mixed in a hot aqueous solution and adjusted to high pH by addition of a base solution (e.g., 10-100 mM NaOH) at a concentration of about 5-25 wt % protein (e.g., 10 wt %). A refined plant protein isolate is extracted into the basic solution and the precipitated solids containing undesired material is removed by centrifugation. The refined protein isolate in the basic solution can then be precipitated (e.g., with 75% phosphoric acid) as a slurry. A range of base-extraction techniques are known in the art and can be used in the pre-treatment of plant proteins in the methods of the present disclosure. One such method for producing a base-extracted plant protein isolate is exemplified in the Examples disclosed herein and provides a refined plant protein isolate of pea-protein useful in the methods of the present disclosure.

In at least one embodiment, the refined plant protein (e.g., pea protein) can be extracted with a basic solution (or "base-extracted") as an initial purification step prior to treatment with an alkaline phosphate salt. Accordingly, in at least one embodiment, the method is carried out wherein the initial plant protein isolate that is treated with an alkaline phosphate salt is a base-extracted plant protein isolate.

Alternatively, it also is contemplated that with some starting ingredients, and/or plant protein sources that the starting plant protein isolate is pre-treated by a neutral extraction. For example, an initial pea flour sample can be mixed in a hot aqueous solution without any pH adjustment. Thus, in at least one embodiment, the method of the present disclosure can be carried out wherein the plant protein isolate is a neutral-extracted plant protein isolate.

The methods for preparing highly soluble plant protein compositions of the present disclosure generally use a refined plant protein such as a plant protein isolate, concentrate, flour, meal, and/or a combination thereof as a starting ingredient. Refined plant proteins useful in the methods can be derived from one or more natural and/or modified non-animal sources, including but not limited to naturally occurring plants, algae, fungi, or microbes.

Non-animal natural sources useful for obtaining plant proteins useful in the methods disclosed herein include, but are not limited to, nature itself (e.g., lakes, oceans, soils, rocks, gardens, forests, plants, animals), brewery stores, and/or commercial cell banks (e.g., ATCC, collaborative sources). Modified non-animal natural sources include, but are not limited to, brewery stores and commercial cell banks (e.g., ATCC, collaborative sources).

In some embodiments, modified non-animal natural sources can be generated from natural sources by methods known in the art, including selection, mutation, or gene manipulation. Selection generally involves continuous multiplication and steady increase in dilution rates under selective pressure. Mutation generally involves selection after exposure to mutagenic agents. Gene manipulation generally involves genetic engineering (e.g., gene splicing, insertion of deletions or modifications by homologous recombination) of target genes. A modified natural source may produce a non-native protein, carbohydrate, lipid, or other compound, or produce a non-native amount of a native protein, carbohydrate, lipid, or other compound. In some embodiments, the modified natural source expresses higher or lower levels of a native protein or metabolic pathway compound.

In some embodiments, the modified natural source of a plant protein useful in the methods of the present disclosure expresses one or more novel recombinant proteins, RNAs, or metabolic pathway components derived from another plant, algae, microbe, or fungus. In some embodiments, the modified natural source of the plant protein has an increased nutraceutical content compared to its native state. In some embodiments, the modified natural source has more favorable growth and production characteristics compared to its native state. In some such embodiments, the modified non-animal natural source has an increased specific growth rate compared to its native state. In other such embodiments, the modified non-animal natural source may utilize a different carbon source than its native state.

Exemplary plant sources of plant proteins useful in the methods and compositions disclosed herein include, but are not limited to, vegetable plants (e.g., carrot, celery), sunflower, potato, sweet potato, tomato, blueberry, nightshades, buckwheat, amaranth, chard, *quinoa*, spinach, hazelnut, canola, kale, bok choy, rutabaga, hemp, pumpkin, squash, legume plants (e.g., alfalfa, lentils, beans, clovers, peas, soybean, peanut, chickpea, green pea, yellow pea, snow pea, lima bean, fava bean), cotton, fruiting plants (e.g., apple, apricot, peach, plum, pear, nectarine), strawberry, blackberry, raspberry, cherry, citrus (e.g., grapefruit, lemon, lime, orange, bitter orange, mandarin), mango, grape, broccoli, brussels, sprout, rapeseed (canola), turnip, cabbage, cucumber, watermelon, honeydew melon, zucchini, cassava, baobab, almond, macadamia, taro, barley, corn, oat, palm, rice, rye, sorghum, triticale, moringa, grain plants, leafy vegetables, non-grain legume plants, millets, green algae, derivatives and crosses thereof or combinations thereof.

In certain embodiments of the present disclosure, suitable plant sources for plant proteins may be selected from one or more of the following: peas, flaxseed, soybeans, lentils, lupin, fava bean, chickpea, sunflower, rapeseed, sugar cane, sugar beet, oat, wheat and corn. In certain embodiments, the suitable plant source may be peas, for example yellow peas. In some embodiments, the plant source is a legume, and optionally, the legume is a pea. The pea may be whole pea or a component of pea, standard pea (i.e., non-genetically modified pea), commoditized pea, genetically modified pea, or combinations thereof. In some embodiments, the pea is *Pisum sativum*. In some embodiments, the legume is soy. The soy may be whole soy or a component of soy, standard soy (i.e., non-genetically modified soy), commoditized soy, genetically modified soy, or combinations thereof. In some embodiments, the legume is chickpea. The chickpea may be whole chickpea or a component of chickpea, standard chickpea (i.e., non-genetically modified chickpea), commoditized chickpea, genetically modified chickpea, or combinations thereof.

Exemplary algae sources for plant proteins useful in the methods and compositions disclosed herein include, but are not limited to, viridiplantae, stramenopiles, rhodophyta, chlorophyta, PX, flordeophyceae, bangiophyceae, florideohpyceae, trebouxiophyceae, phaeophyceae, palmariales, gigartinales, bangiales, gigartinales, *Chlorella, Laminariajaponica, Laminaria saccharina, Laminaria digitata, Macrocystis pyrifera, Alaria marginata, Ascophyllum nodosum, Ecklonia* sp., *Palmaria palmata, Gloiopeltis furcata, Porphyra columbina, Gigartina skottsbergii, Gracilaria lichenoides, Chondrus crispus, Gigartina bursa-pastoris*, derivatives and crosses thereof or combinations thereof. In certain embodiments, examples of suitable algae may be selected from one or more of the following: *Pyropia, Spirolina*, rhodophyta, chlorphyta, and *chlorella*.

Examples of suitable fungi sources for plant proteins useful in the methods and compositions disclosed herein include but are not limited to *Pichia pastoris, Saccharomyces cerevisiae, Saccharomyces pombe*, derivatives and crosses thereof or combinations thereof. In certain embodiments, examples of suitable fungi may be selected from one or more of the following: *Saccharomyces* sp., *Pichia pastoris, Hansunula polymorpha, Aexula adeninivorans, Kluyveromyces lactis, Yarrowia lipolytica*, and *Schizosaccaromyces pombe*. In certain embodiments, a suitable fungus may be *Saccharomyces cerevisiae*. Examples of suitable microbes include but are not limited to firmicutes, cyanobacteria (blue-green algae), bacilli, oscillatoriales, bacillales, lactobacillales, oscillatoriales, bacillaceae, lactobacillaceae, *Arthrospira, Bacillus coagulans, Lactobacillus acidophilus, Lactobacillus Reuteri, Spirulina, Arthrospira platensis, Arthrospira maxima*, derivatives and crosses thereof or combinations thereof. In certain embodiments, examples of suitable microbes may be selected from one or more of the following: *Escherichia coli, Lactobacillus* sp., and *Cornybacterium glutamicum*. In certain embodiments, a suitable microbe may be a protist, such as *Euglena* spp.

Use of Highly Soluble Plant Protein Compositions

The present disclosure provides methods using alkaline phosphate salt treatment to prepare highly soluble plant protein compositions. As noted elsewhere herein, due to their high solubility these plant protein compositions have a variety of uses in the preparation of plant protein based food and beverage products. For example, the plant protein composition can be used as the refined plant protein component in a non-dairy analog or beverage formulation. General methods, compositions, and formulations useful for preparing such non-dairy analogs and beverage formulations are known in the art. See e.g., WO2017/120597A1, published Jul. 13, 2017, which is hereby incorporated by reference herein.

For example, in at least one embodiment, a highly soluble plant protein composition prepared using alkaline phosphate salt treatment according to the methods disclosed herein can be used as the refined protein component in a non-dairy analog. Such a non-dairy analog can be prepared using a method comprising one or more of the following steps, in or out of order: (a) blending at least one lipid (optionally from a non-animal natural source) and a highly soluble refined plant protein composition prepared according to the methods of the present disclosure with water to generate a mixture; and (b) emulsifying at least a portion of the mixture to provide a non-dairy analog. The quantities and proportions of the at least one lipid, and the at least one refined protein component are selected so as to provide a desired stability, dispersibility, and/or solubility and the non-dairy analog has a pH of between 4.0 and 10. In some embodiments, the non-dairy analog can have a pH of between 6.5 and 10.

In another exemplary embodiment, a highly soluble plant protein composition prepared using alkaline phosphate salt treatment according to the methods disclosed herein can be used as the refined protein component in a plant protein-based beverage formulation. Such a beverage formulation can be prepared using a method comprising one or more of the following steps, in or out of order: (a) providing a highly soluble refined plant protein composition prepared according to the methods of the present disclosure; (b) providing at least one other ingredient selected from: (i) sugar and/or a carbohydrate; (ii) a vitamin or a mineral; (iii) a lipid from a non-animal natural source; (iv) an emulsifier; and/or (v) a hydrocolloid or a gum; (c) providing water or carbonated water; and (d) blending the highly soluble refined plant protein composition and the at least one other ingredient with water to generate a mixture. In preparing the beverage formulation, the quantities and proportions of the highly soluble refined plant protein composition, the other ingredients, and the water or carbonated water, can be selected so as to provide a desired stability, dispersibility, and/or solubility a pH of between 6 and 9.

As with the other methods disclosed herein, the highly soluble refined plant protein composition used in preparation of the plant protein based food or beverage products can be sourced from a plant, optionally, a legume, and in some embodiments, the highly soluble refined plant protein composition is sourced from a pea plant or a pea protein.

Lipids from non-animal natural sources useful in non-dairy analogs and beverage formulations are known in the art. In some embodiments, the lipid and/or the highly soluble refined plant protein composition are obtained as slurries. In some embodiments, the lipid and/or plant protein composition are obtained in solid form. In some embodiments, the refined plant protein composition is combined with one or more other proteins prior to being mixed with the at least one lipid.

In carrying out the methods of preparation, it is contemplated that the highly soluble refined plant protein composition may be added to the water as a dry, or substantially dry, solid or as a slurry. In certain embodiments, the refined protein composition is a dry, or substantially dry, solid that contains at least 50%, 60%, 70%, 80%, 90% by weight protein. In certain embodiments, the refined protein composition is provided as a dry, or substantially dry, solid may containing between 50% to 100%, 70% to 90% or 80% to 100% by weight protein. In certain embodiments, the refined protein composition is provided as a slurry contains at least 3%, 5%, 10%, 20%, 30% or 40% by weight protein, or optionally, a slurry that contains between 3% to 40%, 5% to 30%, 5% to 20% or 10% to 30% by weight protein.

The water or aqueous component used in the non-dairy analog or beverage formulation typically includes, but is not limited to, pure water, tap water, bottled water, deionized water, spring water, or a mixture thereof. The aqueous component may also contain suitable dissolved materials.

Generally, in the methods of preparation using highly soluble refined protein compositions of the present disclosure, the lipid, protein, and aqueous components may be mixed in various orders. In some embodiments, these three components are mixed simultaneously. In other embodiments, the lipid is mixed with the protein composition before the aqueous component is introduced into the mixture. In yet other embodiments, the protein component is mixed with the aqueous component before the lipid is introduced into the mixture. In yet other embodiments, the lipid is mixed with the aqueous component before the protein composition introduced into the mixture. The mixing of the lipid, refined protein compositions, and aqueous components may be accomplished using a variety of mixing devices, for example, mechanical agitators and/or pressure jets. The components may also be stirred or mixed by hand. Typically, mixing is carried out until the components are distributed substantially evenly throughout the mixture.

In some embodiments, a carbohydrate component may be also added to the mixture in preparing a food or beverage product using the highly soluble alkaline phosphate salt treated plant protein compositions of the present disclosure. A variety of ingredients may be used as the carbohydrate component, including but not limited to starch, simple sugars, flour, edible fiber, and combinations thereof. Examples of suitable starches include but are not limited to maltodextrin, inulin, fructo oligosaccharides, pectin, gum Arabic, carboxymethyl cellulose, guar gum, gellan gum, corn starch, oat starch, potato starch, rice starch, wheat starch, or combinations thereof. Examples of suitable flours include but are not limited to amaranth flour, oat flour, *quinoa* flour, rice flour, rye flour, sorghum flour, soy flour, wheat flour, corn flour, or combinations thereof. Examples of suitable edible fibers include but are not limited to barley bran, carrot fiber, citrus fiber, corn bran, soluble dietary fiber, insoluble dietary fiber, oat bran, pea fiber, rice bran, head husks, soy fiber, soy polysaccharide, wheat bran, wood pulp cellulose, or combinations thereof. In some embodiments, the carbohydrate component may be guar gum. In some embodiments, a carbohydrate component may be gellan gum. In some embodiments, a carbohydrate component may be a polysaccharide. In some embodiments, the carbohydrate component does not comprise lactose or substantially does not comprise lactose. The carbohydrate component may be present in the aqueous component before mixing. Alternatively, the carbohydrate component is added to the lipid and/or protein components or to the lipid, protein, and aqueous mixture.

Thickening agents may also be used in the preparations, including gelatin, pectin, agar, gums, starches, and ultra-gel. Examples of acceptable gums include sodium alginate, gellan gum, xanthan gum, guar gum or combinations thereof. Examples of acceptable starches include tapioca starch, arrowroot starch or combinations thereof. In some embodiments, the thickening agent may be a guar gum. In some embodiments, the thickening agent may be a gellan gum.

In some embodiments, one or more other ingredients are further added. In some such embodiments, the one or more other ingredients are added to the aqueous component before mixing. In other embodiments, the one or more other ingredients are added to the lipid and/or protein components or to the lipid, protein, and aqueous mixture. In some embodiments, the one or more other ingredients include calcium.

In the methods of preparation of food or beverage products using the highly soluble plant protein composition emulsification can be carried out without additional mechanical energy, or require mechanical energy (for example, vortexing, homogenization, agitation, sonication, or other suitable mechanical activity). When emulsification is aided by lower amounts of mechanical energy (for example, agitation in a conventional mixer under moderate shear of between about 100 rpm and about 1,000 rpm), the average droplet size of the resulting emulsion is typically larger (for example, at least about 75% of the droplets have a diameter greater than about 25 μm). When emulsification is aided by higher amounts of mechanical energy (e.g., homogenization in a high-pressure [for example, between about 35 bar and about 650 bar] 1- or 2-stage homogenizer [e.g., between about 1,000 psi and about 10,000 psi], or microfluidic homogenization [between about 500 and about 2,000 bar], the average droplet size of the resulting emulsion is typically smaller (for example, at least about 75% of the droplets have a diameter of less than about 10 um). Nanoemulsions may be obtained by homogenizing in a microfluidizer or other suitable equipment. In certain applications, to obtain higher lipid emulsions, the lipid component may be added gradually during mixing. Heating may aid in emulsification in certain applications. In some embodiments, emulsification is performed at greater than room temperature, greater than 30° C., 40° C., 50° C., 60° C., 70° C., or 80° C., between 90° C. and 120° C., between 30° C. and 60° C., or between 40° C. and 50° C. Heating is generally followed by cooling. Emulsification may be monitored by removing a sample of the mixture and analyzing it by such methods as microscopy, light scattering, and/or refractometry.

Depending on the food or beverage product being prepared, the emulsions may have droplets of various sizes. In some embodiments, the emulsions are polydisperse emulsions (i.e., emulsions comprising droplets with a broad distribution of droplet sizes). In other embodiments, the emulsions are monodisperse (i.e., emulsions comprising droplets with a narrow distribution of droplet sizes). In some embodiments, the emulsions are microemulsions (i.e., thermodynamic stable systems of dispersed droplets in continuous phase). In other embodiments, the emulsions are nanoemulsions (i.e., metastable [or kinetically stable] dispersions of one liquid in different immiscible liquid having droplet sizes ranging from 1 to 100 nm). In some embodiments, the emulsions have an average droplet size of less than about 1,000 nm, less than about 750 nm, less than about 500 nm, less than about 250 nm, less than about 100 nm, or less than about 50 nm, between about 100 nm and about 800 nm, or between about 100 nm and about 300 nm. In some embodiments, droplet sizes are reduced to reduce the lipid contents of the emulsions and non-dairy analogs provided herein. The degree of emulsification achieved and hence the final textures of the emulsions may be controlled to a certain degree by varying certain parameters during emulsification. Examples of such parameters include, but are not limited to, the type and/or amount of lipid component, the type and/or amount of protein component, the type and/or amount of optional emulsifiers, the amount of mechanical energy used during emulsification, the centrifugation or filtration techniques, the pH of the aqueous component, the temperature during mixing, the amount of optional salt in the aqueous component or combinations thereof.

In some embodiments, the food or beverage products prepared using the highly soluble plant protein compositions of the present disclosure may be sterilized or pasteurized. Sterilization may occur by UV irradiation, heating (e.g. steam sterilization, flaming, or dry heating), or chemical sterilization (e.g., exposure to ozone). In some embodiments, sterilization kills more than 95% of microbes. For example, pasteurization of a non-dairy analog may include heating to a temperature (e.g., between about 280 and about 306° F.) and holding at that temperature for a period of time (e.g., between about 1 and about 10 seconds). Appropriate pasteurization steps are known in the art of food manufacturing and may be undertaken at a variety of temperatures and/or for a variety of time durations. Pasteurization may be high-temperature, short-time (HTST), "extended shelf life" (ESL) treatment, high pressure pasteurization (HPP), ultra-pasteurization (UP), ultra-high temperature (UHT) or combinations thereof. A controlled chilling system may be used to rapidly cool the non-dairy analog. In some embodiments, the non-dairy analogs undergo vacuum cooling to remove volatiles and water vapor following pasteurization.

EXAMPLES

Various features and embodiments of the disclosure are illustrated in the following representative examples, which are intended to be illustrative, and not limiting. Those skilled in the art will readily appreciate that the specific examples are only illustrative of the invention as described more fully in the claims which follow thereafter. Every embodiment and feature described in the application should be understood to be interchangeable and combinable with every embodiment contained within.

Example 1: Solubility of Untreated and Base-Treated Pea-Protein Isolate

This example illustrates an experimental study to determine the solubility in aqueous solution of a base-extracted pea-protein isolate treated with 6M KOH relative to an base-extracted pea-protein isolate prepared without this base treatment step (untreated).

Materials and Methods:

A. Protein Purification 20 kg of pea-protein concentrate was mixed with 180 kg of hot water and NaOH at 10-100 mM. Solid material formed during this initial base-extraction step of the purification was physically separated with a decanter centrifuge (Fooddec decanter centrifuge, Alfa Laval Inc., USA) at a drive speed of 5200 rpm and differential speed of 10 rpm. The soluble protein remaining in the decanted solution was precipitated by addition of 400 g of 75% phosphoric acid, and then concentrated with a disc stack separator at 9200 rpm (Clara 20 disc stack separator, Alfa Laval Inc., USA) to form a pea-protein isolate paste.

B. Base Treatment

The resulting partially purified pea-protein isolate paste was diluted with water to 10 wt % protein. Half of this diluted material was set aside as the untreated pea-protein isolate control. The other half of the diluted paste material (11.5 kg) was base-titrated up to pH 7 by mixing with 47.5 g of 6M KOH. The resulting base-treated and untreated pea-protein isolate was frozen at −3° C.

C. Pasteurization

Samples of the base-treated and untreated protein isolate were thawed and pasteurized using direct sterilization for 70 sec with a holding temperature of 86° C. and flow rate of 20 L/h (OMVE HT220DSI, OMVE Netherlands B.V., The Netherlands).

D. Drying

The pasteurized samples were refrigerated at 4° C., and spray dried (FT80 Tall Form Spray Dryer, Armfield group, UK) using an inlet temperature setting of 250° C. and inlet air pressure of 20 psi. The resulting base-treated and untreated pea-protein isolate spray-dried powders were determined to have a protein content of 70% and 71%, respectively.

E. Solubility Measurements

Aqueous solutions having 5 wt % protein content were prepared using the spray-dried powder of the base-treated and untreated pea-protein isolates. Base-treated and untreated pea-protein isolate solutions were titrated to either pH 4 by addition of 3M phosphoric acid or to pH 9 by addition of 3M NaOH. Separate solutions were used for the titrations with phosphoric acid or NaOH. Throughout the titrations 5 mL aliquots were removed at each pH unit, and centrifuged for 5 min at 3500 rpm. The supernatant and initial solutions were analyzed for soluble and total protein, respectively, to determine % soluble protein.

Results:

As shown by the results depicted in FIG. 1, the spray-dried pea-protein isolate composition prepared with a 6M KOH base treatment step exhibited solubility that was increased by 3.8% increase relative to the untreated pea-protein isolate composition at pH 7.

Example 2: Solubility of Alkaline Phosphate Salt Treated Pea-Protein Isolate

This example illustrates an experimental study to determine the solubility in aqueous solution of pea-protein isolate compositions that are treated with the alkaline phosphate salt, TSP, or the alkaline phosphate salt composition, TXM, which comprises a mixture of alkaline phosphate salts, TSP and SHP.

Materials and Methods:

A. Purification

Pea-protein concentrate was purified using a 10-100 mM NaOH base-extraction as described in Example 1, step A. The resulting pea-protein paste was diluted in water to 12 wt % protein.

B. Alkaline Phosphate Salt Treatment

This diluted material was halved for two separate alkaline phosphate salt treatments: (1) 7.7 kg of diluted 12 wt % pea-protein isolate paste solution was mixed with a 16.4% solution of TSP (164 g TSP mixed with 836 g water and heated to 50-60° C. until TSP fully dissolved) up to a ratio of 7-10 wt % TSP per gram of protein on a dry weight basis; (2) 9.9 kg of pea-protein isolate paste was mixed with a 50% a mixed alkaline-phosphate salt solution made using TXM (TexturMelt LM89, Innophos LTD, USA). TXM is a mixture of 5-20 wt % TSP, 20-40 wt % disodium phosphate, and 50-80 wt % of the polyphosphate sodium salt, sodium hexametaphosphate ("SHP"). The 25% TXM solution was added to reach a final ratio of 35-45 wt % TXM to protein on a dry weight basis.

C. Pasteurization

The resulting alkaline phosphate salt-treated protein solutions were pasteurized using direct sterilization for 70 sec with a holding temperature of 86° C. and a flow-rate of 20 L/h (OMVE HT220DSI, OMVE Netherlands B.V., The Netherlands). The pasteurized material was refrigerated at 4° C.

D. Drying

The pasteurized alkaline phosphate salt-treated pea-protein isolates were processed into a dry powder (Armfield FT80 Tall Form Spray Dryer, Armfield group, UK) using an inlet temperature setting of 250° C. and inlet air pressure of 20 psi. The final spray-dried alkaline phosphate salt-treated pea-protein isolate powders were determined to have a protein content of 70-85%.

E. Solubility Measurements

Protein solubility measurements were performed on both the TSP salt-treated and TXM salt-treated pea-protein isolate powders as described in Example 1.

Figure 2:
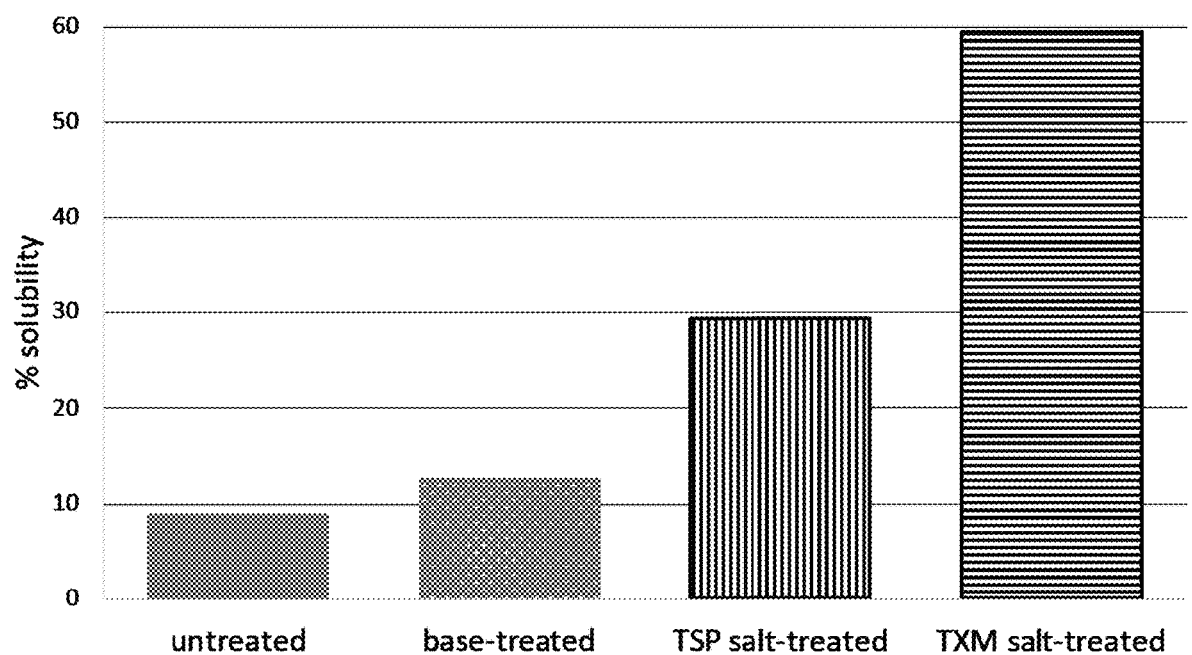
FIG. 2 depicts a plot showing the percent solubility in aqueous solution at pH 7 of spray-dried pea-protein isolates that were base-extracted and treated with alkaline phosphate salts ("TSP": trisodium phosphate, and "TXM": mix of trisodium phosphate, disodium phosphate, and polyphosphate salt) relative to spray-dried pea-protein isolates that were base-treated (with potassium hydroxide), or untreated (no base treatment, or alkaline phosphate salt treatment).

Results:

As shown by the plots depicted in FIG. 2, the TSP treated protein exhibited solubility of ~30% in aqueous solution at pH 7, which was over 3-fold increased relative to the untreated pea-protein isolate and ~2.5-fold increased relative to the base-treated protein (prepared as in Example 1). The TXM treated protein exhibited even higher solubility of ~60% in aqueous solution at pH 7, which was over 6-fold increased relative untreated protein and ~5-fold increased relative to the base-treated pea-protein isolate. For both of the alkaline phosphate salt-treated samples pea-protein solubility was >25% regardless of drying conditions at pH 7.

Example 3: pH Dependent Solubility of Salt-Treated Pea-Protein

This example illustrates an experimental study to determine the pH dependence of the solubility of pea-protein isolate compositions treated with base or alkaline phosphate salts.

Materials and methods: Untreated, base-treated, and alkaline phosphate salt treated pea-protein isolate samples were prepared as spray-dried powders according to procedures of Examples 1 and 2. Solubility measurements were carried out as described in Example 1.

Figure 3:
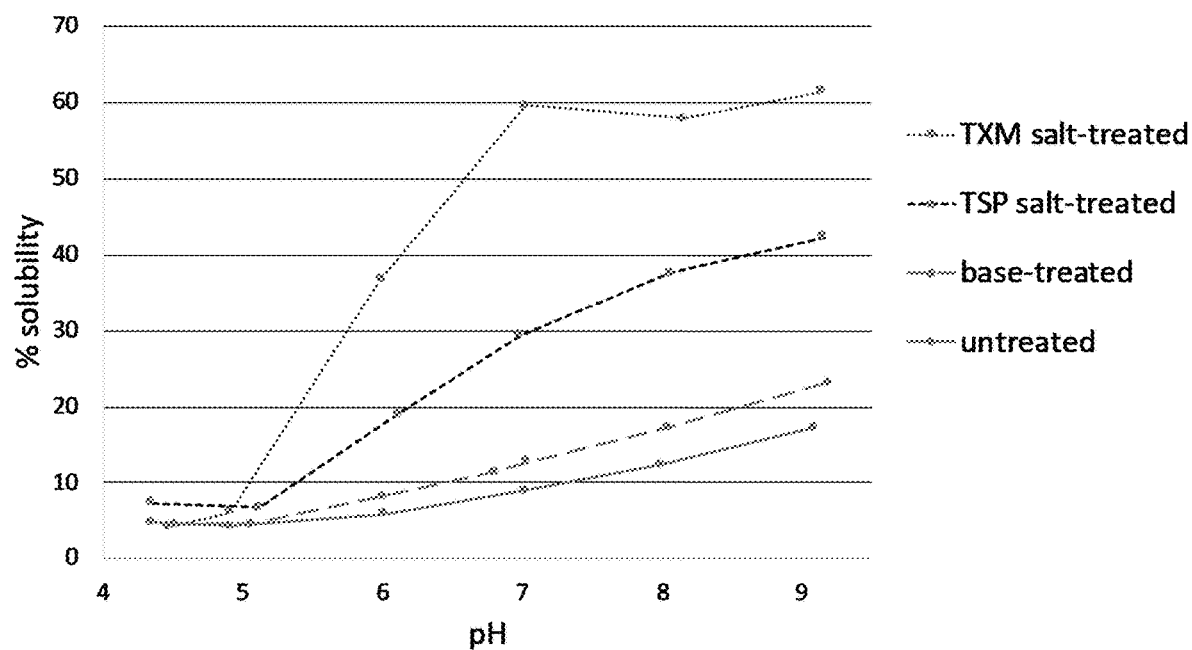
FIG. 3 depicts a plot showing the percent solubility in aqueous solution over a pH range from pH 4 to 9 of spray-dried pea-protein isolates that were base-extracted and treated with alkaline phosphate salts ("TSP": trisodium phosphate, and "TXM": mix of trisodium phosphate, disodium phosphate, and polyphosphate salt), base-treated (base extracted but treated with alkaline non-phosphate salt (potassium hydroxide)), and untreated (no base treatment, or alkaline phosphate salt treatment).

Results: As shown by the plots depicted in FIG. 3, and the values summarized in Table 1, the pea-protein isolate compositions prepared using an alkaline phosphate salt treatment of either TSP or TXM, exhibited greatly increased solubility across a wide range of pH from pH 5 to pH 9, indicating that these isolate compositions can perform well in a variety of food products. Additionally, when alkaline phosphate salt treated protein isolates were dissolved at 5% (wt/wt) in aqueous solution at room temperature and observed over a 120 minute period, the solution exhibited reduced settling of solids relative to comparable solutions of untreated or base-treated pea-protein isolates.

TABLE 1

Percent solubility in aqueous solution over a pH range from pH 4 to 9

| | Solubility (%) | | | |
|---|---|---|---|---|
| pH | Control (untreated) | Base (KOH) | TSP | TXM |
| 4.5 | 4.8 | 4.5 | 7.4 | 4.1 |
| 5 | 4.3 | 4.5 | 6.7 | 6.2 |
| 6 | 5.9 | 8.2 | 18.9 | 36.8 |
| 7 | 8.9 | 12.7 | 29.4 | 59.6 |
| 8 | 12.4 | 17.3 | 37.6 | 57.8 |
| 9 | 17.3 | 23.1 | 42.3 | 61.4 |

Example 4: Effect of Phosphate Ion Type on Solubility

This example illustrates differing effects of treatment with mono-, di-, and tri-sodium or potassium phosphate salt treatments on solubility of pea protein isolate.

Materials and methods: Untreated pea-protein isolate samples were prepared as spray-dried powders according to procedures of Examples 1 and 2. Solubility measurements were carried out as described in Example 1.

Results: As shown in Table 2, treatment with the alkaline phosphate salts, TSP or tripotassium phosphate significantly increased the solubility of pea protein isolate compared to treatment with the mono-/di-potassium or mono-/di-sodium phosphate salts at the same concentration.

TABLE 2

Pea protein solubility in mono-, di, and tri- valent phosphate salt solutions

| Phosphate Salt (0.25M) | Protein Solubility (%) |
|---|---|
| Monopotassium Phosphate | 7.90 |
| Dipotassium Phosphate | 11.0 |
| Tripotassium Phosphate | 32.1 |
| Monosodium Phosphate | 8.66 |
| Disodium Phosphate | 6.38 |
| Trisodium Phosphate | 28.1 |

Example 5: Analysis of Alkaline Phosphate Salt Treated Pea Protein Compositions

This example illustrates an experimental study to determine compositional effect on pea protein isolate when titrated with trisodium phosphate (TSP) or TexturMelt (TXM).

Materials and methods: Wet protein was prepared according to procedures of Examples 1 and 2. Material was titrated to pH 6, 7, 8, or 9, using a 16.4% TSP solution (pH=11.8), or titrated pH 6, or 7, using a 33% TXM solution (pH=7.5). Dry solids (DS) were measured on a Sartorius Moisture Analyzer. Protein was measured using a LECO combustion analyzer. Phosphate was calculated from the measured amount of phosphorus via ICP-MS analysis. Phosphate salt wt % was calculated based on how much of alkaline phosphate salt (TSP or TXM) was added to titrate to each pH in comparison to total dry protein.

Results: The results of the compositional analysis of protein, phosphate salt and phosphate composition of the total material on a dry basis resulting from phosphate salt titration with either TSP or TXM as described in this example are provided in Table 3 below.

TABLE 3

| Sample | pH | Protein (wt %) (dry wt basis) | Alkaline Phosphate Salt (wt %) (dry wt basis)** | Phosphate (wt %) (dry wt basis)*** | Alkaline Phosphate Salt to Protein Content (%) (dry wt basis) |
|---|---|---|---|---|---|
| Control (-TSP) | 5.17 | 76.8 | 0.00 | 2.58 | 0.00 |
| TSP-pH 6 | 5.98 | 77.4 | 2.63 | 3.75 | 3.40 |
| TSP-pH 7 | 6.96 | 78.1 | 6.88 | 5.26 | 8.81 |
| TSP-pH 8 | 7.99 | 73.4 | 12.5 | 6.45 | 17.0 |
| TSP-pH 9 | 8.96 | 70.7 | 14.3 | 6.68 | 20.2 |
| Control (-TXM) | 5.18 | 78.2 | 0.00 | 3.37 | 0.00 |
| TXM-pH 6 | 6.00 | 74.4 | 4.51 | 5.83 | 6.06 |
| TXM-pH 7 | 6.96 | 63.0 | 25.7 | 16.4 | 40.8 |

**Calculated from the measured amount of phosphate salt added

***Calculated from the amount of phosphorus within the sample determined via ICP-MS (phosphorus to phosphate conversion of 1 phosphorus to 3.0661 phosphate)

Example 6: Effect of Phosphate Salt Type on Protein Solubility

This example illustrates an experimental study to determine how varying phosphate effect the final protein solubility Materials and Methods:

A. Protein Purification

Pea flour (10 wt %) was mixed with hot water and NaOH at 10-100 mM. Solid material formed during this initial base-extraction step of the purification was physically separated with a decanter centrifuge. The soluble protein remaining in the decanted solution was precipitated by addition of 75% phosphoric acid to a pH of 4-6, and then concentrated with a disc stack to form a pea-protein isolate paste.

B. Phosphate Salt Treatment

A portion of the resulting partially purified pea-protein isolate was set aside as the untreated pea-protein isolate control ("Control (no salt add)"). The remaining partially purified pea-protein isolate paste was treated with varying amounts of TSP, SHP, the alkaline phosphate salt composition, TXM, or the phosphate salt, sodium acid pyrophosphate (SAP). Each salt was added at two different levels and final concentration of the salt on a dry basis as summarized in Table 4. Dry solids (DS) were measured on a Sartorius Moisture Analyzer. Protein was measured using a LECO combustion analyzer. Phosphate was calculated from the measured amount of phosphorus via ICP analysis. Phosphate salt wt % was calculated based on how much of the phosphate salt, SAP, or the alkaline phosphate salts, TSP and TXM, were added to titrate to each pH in comparison to total dry protein.

TABLE 4

Sample descriptions, conditions and compositional analysis

| Phosphate Salt | Sample Label | pH | Protein (wt %) (dry wt basis) | Phosphate salt (wt %) (dry wt basis)** | Phosphate (wt %) (dry wt basis)*** | Alkaline Phosphate Salt to Protein Content (%) (dry wt basis) |
|---|---|---|---|---|---|---|
| Control (no salt added) | Control | 4.7 | 80.3 | 0.00 | 3.00 | 0.00 |
| TSP | TSP-1 | 6.0 | 78.9 | 4.67 | 4.47 | 5.92 |
|  | TSP-2 | 7.0 | 78.9 | 10.2 | 5.75 | 12.9 |
| TXM | TXM-1 | 6.0 | 73.8 | 11.2 | 10.9 | 15.2 |
|  | TXM-2 | 7.0 | 45.6 | 43.1 | 31.7 | 94.4 |
| SAP | SAP-1 | 4.7 | 74.9 | 4.26 | 6.12 | 0.00 |
|  | SAP-2 | 4.6 | 63.8 | 21.0 | 17.7 | 0.00 |
| SHP | SHP-1 | 5.2 | 71.35 | 11.3 | 12.4 | 15.9 |
|  | SHP-2 | 5.0 | 44.02 | 41.1 | 34.2 | 93.3 |

**Calculated from the measured amount of phosphate salt added

***Calculated from the amount of phosphorus within the sample determined via ICP (phosphorus to phosphate conversion of 1 phosphorus to 3.0661 phosphate)

C. Pasteurization

Samples of the phosphate salt-treated and untreated protein isolate were pasteurized using a heated mixer for 60 sec with a holding temperature of 90° C.

D. Solubility Measurements

Pasteurized samples from step C of phosphate salt-treated and untreated pea-protein isolates were diluted 1:1 with water. Phosphate salt-treated and untreated pea-protein isolate solutions were titrated to either pH 3 by addition of 3M hydrochloric acid (HCl) or to pH 10 by addition of 3M NaOH. Separate solutions were used for the titrations with HCl or NaOH. Throughout the titrations 5 mL aliquots were removed at each pH unit, and centrifuged for 5 min at 3500 rpm. The supernatant and initial solutions were analyzed for soluble and total protein, respectively, to determine % soluble protein.

Results:

As shown by the results summarized in Table 5, the pea-protein isolate composition prepared with the treatment using the alkaline phosphate salts, trisodium phosphate (TSP), TexturMelt (TXM), and Sodium Hexametaphosphate (SHP) showed highest increase in solubility. The pea protein isolate composition prepared using treatment with sodium pyrophosphate (SAP) exhibited a minimal increase in solubility.

TABLE 5

Solubility results from varying phosphate salt treatments

| | Solubility (%) | | | | | | | | |
|---|---|---|---|---|---|---|---|---|---|
| pH | Control | TSP-1 | TSP-2 | TXM-1 | TXM-2 | SAP-1 | SAP-2 | SHP-1 | SHP-2 |
| 3 | 8 | 7 | 14 | 5 | 5 | 8 | 6 | 5 | 4 |
| 4 | 6 | 6 | 8 | 4 | 5 | 6 | 6 | 5 | 5 |
| 5 | 5 | 5 | 7 | 5 | 12 | 6 | 7 | 9 | 18 |
| 6 | 5 | 6 | 24 | 11 | 29 | 6 | 8 | 11 | 24 |
| 7 | 7 | 7 | 24 | 13 | 30 | 7 | 10 | 12 | 24 |
| 8 | 8 | 8 | 25 | 14 | 30 | 9 | 11 | 13 | 25 |
| 9 | 9 | 10 | 25 | 15 | 30 | 10 | 13 | 15 | 27 |
| 10 | 11 | 11 | 25 | 15 | 31 | 11 | 14 | 16 | 27 |

Notwithstanding the appended claims, the disclosure set forth herein is also defined by the following clauses, which may be beneficial alone or in combination, with one or more other causes or embodiments. Without limiting the foregoing description, certain non-limiting clauses of the disclosure numbered as below are provided, wherein each of the individually numbered clauses may be used or combined with any of the preceding or following clauses. Thus, this is intended to provide support for all such combinations and is not necessarily limited to specific combinations explicitly provided below:

1. A method for preparing a plant protein composition comprising: (a) adding an alkaline phosphate salt composition to an aqueous solution of a plant protein isolate having a protein content of 5-20%, wherein the added alkaline phosphate salt to protein content on a dry weight basis is 3-98%, 3-45%, 4-20%, or 10-95%.
2. The method of clause 1, wherein the method further comprises: (b) pasteurizing the solution of step (a) to a temperature of 73-86° C. for at least 30-70 seconds; and (c) drying the solution of step (b) to form a plant protein composition having a protein content of at least 70%.
3. The method of any one of clauses 1-2, wherein the alkaline phosphate salt composition comprises a salt of an orthophosphate ion, metaphosphate, trimetaphosphate, and/or hexametaphosphate with an alkali metal ion and/or an alkaline earth metal ion.
4. The method of any one of clauses 1-3, wherein the alkaline phosphate salt composition comprises trisodium phosphate and/or tripotassium phosphate; optionally, wherein the alkaline phosphate salt composition comprises trisodium phosphate and/or tripotassium phosphate in an amount of 5-100 wt %.
5. The method of any one of clauses 1-4, wherein the added alkaline phosphate salt to protein content on a dry weight basis is 3-45%, or 4-20%.
6. The method of any one of clauses 1-5, wherein the alkaline phosphate salt composition comprises hexametaphosphate sodium salt and/or hexametaphosphate potassium salt; optionally, in an amount of 5-100 wt %
7. The method of any one of clauses 1-6, wherein the added alkaline phosphate salt to protein content on a dry weight basis 10-95%.
8. The method of any one of clauses 1-7, wherein the alkaline phosphate salt composition comprises: (a) trisodium phosphate and/or tripotassium phosphate; (b) disodium phosphate and/or dipotassium phosphate; and (c) hexametaphosphate sodium salts and/or hexametaphosphate potassium salts; optionally, 5-20 wt % trisodium phosphate and/or tripotassium phosphate; 20-40 wt % disodium phosphate and/or dipotassium phosphate; and 50-80 wt % hexametaphosphate sodium salts and/or hexametaphosphate potassium salts.
9. The method any one of clauses 1-8, wherein the aqueous solution of plant protein isolate is pH 5-10; optionally, wherein the plant protein isolate is pH 6.5-9.5.
10. The method of any one of clauses 1-9, wherein the plant protein isolate is:
    (a) a base-extracted plant protein isolate; optionally, wherein the base-extracted plant protein isolate is prepared by extraction of a plant protein concentrate solution with 10-100 mM NaOH; or
    (b) a neutral-extracted plant protein isolate; optionally, wherein the neutral-extracted plant protein isolate is prepared by extraction of a plant protein concentrate solution with hot water.
11. The method of any one of clauses 1-10, wherein step (c) comprises spray-drying the solution to form a powder plant protein composition; optionally, wherein the powder plant protein composition comprises a protein content of 70-95 wt %.
12. The method of any one of clauses 1-11, wherein the plant protein composition exhibits an aqueous solubility at pH 7 of at least 20%, at least 25%, at least 30%, at least 40%, at least 50%, or at least 60%.

13. The method of any one of clauses 1-12, wherein the aqueous solubility at pH 7 of the plant protein composition relative to the aqueous solubility at pH 7 of a plant protein composition prepared without adding an alkaline phosphate salt composition to an aqueous solution of plant protein isolate having a protein content of 5-20% is increased by at least 2-fold, at least 3-fold, at least 4-fold, at least 5-fold, or more.
14. The method of any one of clauses 1-13, wherein the plant protein isolate is: (a) from a legume; (b) from a pea plant; or (c) is pea protein isolate.
15. A plant protein composition prepared according to the method of any one of clauses 1-14.
16. A plant protein composition comprising a dried plant protein isolate comprising at least 70 wt % protein content and an added alkaline phosphate salt to protein content on a dry weight basis is 3-98%, 3-45%, 4-20%, or 10-95%.
17. The composition of clause 16, wherein the alkaline phosphate salt comprises a salt of an orthophosphate ion, metaphosphate, trimetaphosphate, and/or hexametaphosphate with an alkali metal ion and/or an alkaline earth metal ion.
18. The composition of any one of clauses 16-17, wherein the alkaline phosphate salt comprises trisodium phosphate and/or tripotassium phosphate; optionally, wherein the alkaline phosphate salt comprises trisodium phosphate and/or tripotassium phosphate in an amount of 5-100 wt %, 70-100 wt %, 80-100 wt %, or 90-100 wt %.
19. The composition of any one of clauses 16-18, wherein the added alkaline phosphate salt to protein content on a dry weight basis is 3-45%, or 4-20%.
20. The composition of any one of clauses 16-19, wherein the alkaline phosphate salt comprises hexametaphosphate sodium salt and/or hexametaphosphate potassium salt; optionally, in an amount of 5-100 wt %, 50-80%, 70-100 wt %, 80-100 wt %, or 90-100 wt %.
21. The composition of any one of clauses 16-20, wherein the added alkaline phosphate salt to protein content on a dry weight basis is 10-95%.
22. The composition of any one of clauses 16-21, wherein the alkaline phosphate salt comprises: (a) trisodium phosphate and/or tripotassium phosphate; and (b) hexametaphosphate sodium salts and/or hexametaphosphate potassium salts; optionally, 5-20 wt % trisodium phosphate and/or tripotassium phosphate, and 50-80 wt % hexametaphosphate sodium salts and/or hexametaphosphate potassium salts.
23. The composition of any one of clauses 16-22, wherein the composition has an aqueous solubility at pH 7 of at least 20%, at least 25%, at least 30%, at least 40%, at least 50%, or at least 60%.
24. The composition of any one of clauses 16-23, wherein the composition has an aqueous solubility at pH 7 relative to the aqueous solubility at pH 7 of a plant protein composition without the alkaline phosphate salt is increased by at least 2-fold, at least 3-fold, at least 4-fold, at least 5-fold, or more.
25. The composition of any one of clauses 16-24, wherein the plant protein isolate is a base-extracted plant protein isolate; optionally, a base-extracted plant protein isolate prepared by extraction of a plant protein concentrate solution with 10-100 mM NaOH.
26. The composition of any one of clauses 16-25, wherein the plant protein isolate is a neutral-extracted plant protein isolate; optionally, a neutral-extracted plant protein isolate is prepared by extraction of a plant protein concentrate solution with hot water.
27. The composition of any one of clauses 16-26, wherein the plant protein isolate is from a legume; a pea plant; or is a pea protein isolate.
28. A food or beverage product comprising a plant protein composition prepared according to the method of any one of clauses 1-15.
29. A food or beverage product comprising a plant protein composition according to any one of clauses 16-27.

While the foregoing disclosure of the present invention has been described in some detail by way of example and illustration for purposes of clarity and understanding, this disclosed embodiments and examples provided herein are for illustrative purposes, and intended to be exemplary. It will be clear to one skilled in the art that various modifications or changes to the examples, descriptions, and embodiments described herein can be made and are to be included within the spirit and purview of this disclosure and the appended claims. Further, one of skill in the art will recognize a number of equivalent methods and procedure to those described herein. All such equivalents are to be understood to be within the scope of the present disclosure and are covered by the appended claims.

Additional embodiments of the invention are set forth in the following claims.

The disclosures of all publications, patent applications, patents, or other documents mentioned herein are expressly incorporated by reference in their entirety for all purposes to the same extent as if each such individual publication, patent, patent application or other document were individually specifically indicated to be incorporated by reference herein in its entirety for all purposes and were set forth in its entirety herein. In case of conflict, the present specification, including specified terms, will control.

What is claimed is:

1. A method for producing a pea protein composition comprising:
    (a) adding an alkaline phosphate salt composition to an aqueous solution of a pea protein isolate having a protein content of 5-20%, wherein the added alkaline phosphate salt composition to protein content on a dry weight basis is 3-98%, 3-45%, 4-20%, or 10-95%, wherein the added alkaline phosphate salt composition comprises a salt of an orthophosphate ion;
    (b) pasteurizing the solution of step (a) to a temperature of 73-86° C. for at least 30-70 seconds; and
    (c) drying the solution of step (b) to form a pea protein composition having a protein content of at least 70%.
2. The method of claim 1, wherein the added alkaline phosphate salt composition comprises trisodium phosphate and/or tripotassium phosphate; optionally, in an amount of 5-100 wt %.
3. The method of claim 2, wherein the added alkaline phosphate salt composition to protein content on a dry weight basis is 3-45%, or 4-20%.
4. The method of claim 2, wherein the added alkaline phosphate salt composition further comprises hexametaphosphate sodium salt and/or hexametaphosphate potassium salt; optionally, in an amount of 5-95 wt. %.
5. The method of claim 4, wherein the added alkaline phosphate salt composition to protein content on a dry weight basis is 10-95%.
6. The method of claim 1, wherein the aqueous solution of plant protein isolate is pH 5-10.

7. The method of claim 1, wherein the pea protein isolate is:
(a) a base-extracted pea protein isolate; or
(b) a neutral-extracted pea protein isolate.

8. The method of claim 1, wherein step (c) comprises spray-drying the solution to form a powder pea protein composition.

9. The method of claim 1, wherein the pea protein composition exhibits an aqueous solubility at pH 7 of at least 20%, at least 25%, at least 30%, at least 40%, at least 50%, or at least 60%.

10. The method of claim 1, wherein the aqueous solubility at pH 7 of the pea protein composition relative to the aqueous solubility at pH 7 of a pea protein composition prepared without adding an alkaline phosphate salt composition comprising a salt of an orthophosphate ion to an aqueous solution of pea protein isolate having a protein content of 5-20% is increased by at least 2-fold, at least 3-fold, at least 4-fold, at least 5-fold, or more.

11. A pea protein composition prepared according to the method of claim 1.

12. A food or beverage product comprising a pea protein composition prepared according to the method of claim 1.

13. A pea protein composition comprising a dried pea protein isolate comprising at least 70 wt. % protein content and an added alkaline phosphate salt composition to protein content on a dry weight basis of 3-98%, 3-45%, 4-20%, or 10-95%, wherein the alkaline phosphate salt composition comprises a salt of an orthophosphate ion.

14. The composition of claim 13, wherein the alkaline phosphate salt composition comprises trisodium phosphate and/or tripotassium phosphate; optionally, in an amount of 5-100 wt. %, 70-100 wt. %, 80-100 wt. %, or 90-100 wt. %.

15. The composition of claim 14, wherein the added alkaline phosphate salt composition to protein content on a dry weight basis is 3-45%, or 4-20%.

16. The composition of claim 13, wherein the alkaline phosphate salt further comprises hexametaphosphate sodium salt and/or hexametaphosphate potassium salt; optionally, in an amount of 5-95 wt. %, 50-80%, 70-95 wt. %, 80-95 wt. %, or 90-95 wt. %.

17. The composition of claim 16, wherein the added alkaline phosphate salt composition to protein content on a dry weight basis is 10-95%.

18. The composition of claim 13, wherein the composition has an aqueous solubility at pH 7 of at least 20%, at least 25%, at least 30%, at least 40%, at least 50%, or at least 60%.

19. The composition of claim 13, wherein the aqueous solubility at pH 7 of the composition relative to the aqueous solubility at pH 7 of a pea protein composition without the alkaline phosphate salt is increased by at least 2-fold, at least 3-fold, at least 4-fold, at least 5-fold, or more.

20. The composition of claim 13, wherein the plant protein isolate is a base-extracted plant protein isolate; optionally, a base-extracted plant protein isolate prepared by extraction of a plant protein concentrate solution with 10-100 mM NaOH.

21. The composition of claim 13, wherein the plant protein isolate is a neutral-extracted plant protein isolate; optionally, a neutral-extracted plant protein isolate is prepared by extraction of a plant protein concentrate solution with hot water.

22. A food or beverage product comprising a pea protein composition according to claim 13.

* * * * *